US012574739B2

(12) United States Patent
Ziller et al.

(10) Patent No.: US 12,574,739 B2
(45) Date of Patent: Mar. 10, 2026

(54) ID TRANSMITTER FOR AUTHENTICATION, SET FOR ASSEMBLING AN ID TRANSMITTER, AND SYSTEM

(71) Applicants: Huf Hülsbeck & Fürst GmbH & Co. KG, Velbert (DE); Volkswagen Aktiengesellschaft, Wolfsburg (DE)

(72) Inventors: Boris Ziller, Ratingen (DE); Marco Diekers, Neuss (DE); Bernd Ette, Wolfsburg (DE)

(73) Assignees: HUF HÜLSBECK & FÜRST GmbH & CO. KG, Velbert (DE); Volkswagen Aktiengesellschaft, Wolfsburg (DE)

( * ) Notice: Subject to any disclaimer, the term of this patent is extended or adjusted under 35 U.S.C. 154(b) by 141 days.

(21) Appl. No.: 18/604,385

(22) Filed: Mar. 13, 2024

(65) Prior Publication Data

US 2024/0314569 A1 Sep. 19, 2024

(30) Foreign Application Priority Data

Mar. 17, 2023 (DE) .......................... 102023106810.5

(51) Int. Cl.
*H04W 12/47* (2021.01)
*H04L 9/08* (2006.01)
*H04W 12/0431* (2021.01)

(52) U.S. Cl.
CPC .......... *H04W 12/47* (2021.01); *H04L 9/0825* (2013.01); *H04W 12/0431* (2021.01)

(58) Field of Classification Search
CPC .. H04W 12/47; H04W 12/0431; H04L 9/0825
See application file for complete search history.

(56) References Cited

U.S. PATENT DOCUMENTS

| | | | |
|---|---|---|---|
| 10,538,220 B1 * | 1/2020 | Tyagi | .................... B60R 25/245 |
| 2004/0006707 A1 | 1/2004 | Pretzlaff et al. | |
| 2015/0116079 A1 | 4/2015 | Mishra et al. | |

(Continued)

FOREIGN PATENT DOCUMENTS

| | | |
|---|---|---|
| DE | 102007042846 A1 | 5/2009 |
| DE | 102010064257 A1 | 2/2012 |

(Continued)

OTHER PUBLICATIONS

Corresponding European Appln. Ser. No. 24157029.0. Search Report (Jul. 16, 2024).

(Continued)

*Primary Examiner* — Hee K Song
(74) *Attorney, Agent, or Firm* — Peter Zura; LOZA & LOZA, LLP

(57) ABSTRACT

An ID transmitter for authentication on an access control unit of a physical unit. The ID transmitter may include an ID transmitter-BLE interface with an antenna, a microcontroller, a switching apparatus and a battery compartment to accommodate a battery. The microcontroller is arranged, in response to the receipt of the switching signal, to trigger the sending of an authentication signal that includes authentication information, and that is configured as a BLE beacon data packet. A set for assembling an ID transmitter and a system including an ID transmitter and a physical unit are disclosed.

18 Claims, 1 Drawing Sheet

(56)  References Cited

U.S. PATENT DOCUMENTS

| | | | |
|---|---|---|---|
| 2017/0023634 A1 | 1/2017 | Takehara et al. | |
| 2017/0236346 A1* | 8/2017 | Murar ................ | G07C 9/00309 |
| | | | 340/5.61 |
| 2020/0052910 A1* | 2/2020 | Ho ........................ | H04L 9/0891 |
| 2020/0097787 A1 | 3/2020 | Guerrero et al. | |
| 2021/0028928 A1 | 1/2021 | Hariharan et al. | |
| 2024/0314569 A1* | 9/2024 | Ziller ................... | H04W 12/47 |

FOREIGN PATENT DOCUMENTS

| | | | |
|---|---|---|---|
| DE | 102020214381 A1 | 5/2022 | |
| JP | 2013001327 A | 1/2013 | |
| JP | 2019073264 A | 5/2019 | |
| JP | 2019133349 A | 8/2019 | |
| WO | 2023030776 A1 | 3/2023 | |

OTHER PUBLICATIONS

Priority German Application No. 102023106810.5. Examination Report (Feb. 12, 2024).

Takahashi et al. "Development of Search System for Missing People Using EddyStone-URL." Technical Research Report by the Institute of Electronics, Information and Communication Engineers; vol. 116; No. 407; IEICE Technical Report; Japan; The Institute of Electronics, Information and Communication Engineers; pp. 13 to 17 (Jan. 12, 2017).

Mukaida et al. "A monitoring system using BLE advertising packets for estimating congestion degree on university campuses." Technical Research Report by the Institute of Electronics, Information and Communication Engineers; vol. 120; No. 315 [online]; IEICE Technical Report; Japan; Institute of Electronics, Information and Communication Engineers; pp. 63 to 68 (Jan. 13, 2021).

Tanaka et al. "Proposal on Wi-Fi Wake-Up Control Using Bluetooth4. 0(BLE) for Energy Saving in Mobile Device" Collection of Theses of Multimedia, Dispersion, Cooperation, and Mobile (DICOMO2015) Symposium; vol. 2015; No. 1; [CD-ROM]; IPSJ Symposium Series; Japan; Information Processing Society of Japan; pp. 118 to 123 (Jul. 8, 2015).

Corresponding Japanese Application No. 2024-04142. Second Office Action (Aug. 19, 2025).

* cited by examiner

ID TRANSMITTER FOR AUTHENTICATION, SET FOR ASSEMBLING AN ID TRANSMITTER, AND SYSTEM

RELATED APPLICATIONS

The present application claims priority to German Pat. App. No. DE 10 2023 106 810.5, filed Mar. 17, 2023, to Ziller et al., the contents of each being incorporated by reference in their entirety herein

TECHNICAL FIELD

The present disclosure relates to an ID transmitter, for authentication on an access control unit of a physical unit, whereby for authentication, authentication information is sent by the ID transmitter. The present disclosure further relates to a set for assembling an ID transmitter. Furthermore, the present disclosure relates to a system that includes the ID transmitter.

BACKGROUND

It is known from practice to undertake authentication with a portable ID transmitter on an access control unit of the physical unit. After successful authentication the access control unit grants access to the physical unit or to one or more functions of the physical unit. The physical unit may, for example, be configured as a vehicle. For a physical unit configured as a vehicle it has already been known for some time from practice that these have an access control unit configured as an electronic locking system. Electronic locking systems known from practice are based, for example, on the use of ID transmitters that are configured as portable radio keys, and that communicate with the vehicle via radio.

Locking systems of vehicles that communicate with ID transmitters configured as radio keys are known in practice, for example under the names Passive-Entry/Passive-Start (PEPS). Such systems are based, for example, on a combination of low-frequency and high-frequency radio communication that is carried out bidirectionally between the ID transmitter and a central control unit of the vehicle.

In combination with other devices on the vehicle, for example proximity sensors, such systems provide a combination of high user comfort on the one hand, and good safety on the other.

In accordance with the manner of proceeding described, systems of that type mentioned are comparatively elaborate, which is associated with, among other things, correspondingly high costs. Such systems are therefore particularly well suited for use on or in premium product. At the same time, in order to round out the product palette, there is also the desire to also provide less cost-intensive systems for the authentication of an ID transmitter on an access control unit of a physical unit. At the same time, the cost-efficiency sought should not stand in the way of an appropriate safety standard and a contemporary comfort level of the system.

SUMMARY

Against the background of the, aspects of the present disclosure are based on providing solutions that fulfills the requirements described.

Accordingly, an ID transmitter is disclosed for authentication on an access control unit of a physical unit comprising features found in the subject matter of the claims below. A set is also disclosed for assembling an ID transmitter with the features found in the claims below. Finally, a system is disclosed comprising an ID transmitter and a physical unit comprising features found in the subject matter of the claims below.

In some examples, an ID transmitter is disclosed for authentication on an access control unit of a physical unit. The authentication takes place using authentication information that is sent by the ID transmitter. The access control unit serves to lock and/or release access to the physical unit, whereby the release takes place after a successful authentication and is not a component of the ID transmitter described. One example of the physical unit can be a vehicle. The access control unit of the vehicle may, for example, be configured as an electronic locking system of the vehicle.

The ID transmitter may be portable and have at least one ID transmitter-BLE interface. The term "BLE interface" as used herein refers to the totality of components suitable for BLE ("Bluetooth Low Energy") communication pursuant to Bluetooth specifications. Thus, the hardware and software-side prerequisites for the operation of BLE communication in compliance with specifications are fulfilled. In particular, the BLE interface, as mentioned, has an antenna. A BLE interface may, for example, be a module that fulfills all prerequisites needed for BLE communication; but a totality of individual components coupled with one another can also be provided. The ID transmitter-BLE interface may, for example, be configured as a commercially available Bluetooth module.

In some examples, a set (or "kit") is disclosed for assembling an ID transmitter. The set comprises the first ID transmitter part and the second transmitter part separately, whereby the first ID transmitter part and the second ID transmitter part are present separately from one another, and whereby the ID transmitter can be produced by connecting the first ID transmitter part to the second ID transmitter part. The provision of such a set has the advantage that even in a non-assembled state, a second ID transmitter part is present, which includes the separate memory element, so that—particularly when the separate memory element is in the form of an RFID transponder or an NFC tag, even without the presence of a first ID transmitter part—there is still the option to make the physical unit accessible. The expanded function of the provision of the authentication signal as a BLE beacon data as a result of the triggering of a switching apparatus can thus be offered, for one thing, as an option. Moreover, the separate provision of the two parts allows the option of replacing the first ID transmitter part, for example in the event of a defect in this electronic component, with a replacement component and thus enable a cost-effective and resource-sparing provision of the ID transmitter.

In some examples, the first ID transmitter part and the second ID transmitter part may be configured with connection apparatuses that are complementary. An example of a suitable complementary connection apparatus is a bayonet catch. The advantage of a complementary connection means, such as a bayonet catch, is that the combination of the first ID transmitter part and the second ID transmitter part is possible without gluing the parts, whereby in particular a simpler replaceability of the first ID transmitter part, for example in the event of a defect, is possible.

In some examples, a system is disclosed, comprising an ID transmitter of the type described herein and a physical unit having an access control unit. Here, the access control unit comprises: an access control unit-BLE interface with an antenna, control and memory apparatus coupled with the access control unit-BLE interface, whereby the control and memory apparatus are configured to test authentication information received from the access control unit-BLE interface for its authenticity.

In this example, the access and memory apparatus are equipped with the computational capabilities and corresponding information, for example using an asymmetrical encryption process with the private key of the access control unit, starting from the receipt of the authentication signal configured as a BLE beacon data packet, to extract the authentication information and then to compare the authentication information with a corresponding comparative value, in order to test the authenticity of the authentication information and, using this test to determine whether the ID transmitter is an ID transmitter that is authenticated for access to a function of the physical unit.

The authentication information present on the ID transmitter and on the control and memory apparatus may be allocated to one another, preferably complementary cryptographic keys, whereby the term "complementary cryptographic key" may be understood such that the cryptographic keys belong to one another. Some examples may include a private and a public key of an asymmetrical encryption process, and/or two identical cryptographic keys of a symmetrical encryption process.

In some examples, a physical unit may be configured with a number of n, but at least two, access control unit-BLE interfaces, which are arranged on the physical unit at a distance from one another. The control and memory apparatus are configured such that RSSI values that are captured on the access control unit-BLE interface upon receipt of the authentication signal are used in order to evaluate an n-lateration and/or an n-angulation for determining the position of the ID transmitter. This means, for example, that in the event that three access control unit-BLE interfaces are present, the control and memory apparatus are configured to perform a trilateration and/or a triangulation in order to obtain the position determination of the ID transmitter using evaluation of the RSSI values captured.

In some examples, an NFC reader with control and memory apparatus is arranged on the physical unit, whereby the control and memory apparatus are configured to test the authenticity of authentication information captured with the NFC reader. In such a system, the physical unit is accordingly configured, with a further development of an ID transmitter as described above, having an NFC tag, to carry out data transfer and to use authentication information received from the ID transmitter to test the authenticity.

In some examples, the system may be configured with a smartphone that is arranged to send out the authorization signal as a BLE beacon data packet. Currently commercially available smartphones are customarily set up to transmit BLE messages. Pursuant to this further development, the smartphone may additionally be prepared, for example by means of an app provided, to transmit the authentication signal, in order to switch on access to the physical unit or to a function of the physical unit. It may also be provided that smartphone and ID transmitter redundancy are present and allow a choice of authentication means to enable access to the function of the physical unit and can be selected depending on the user's preference.

In some examples, the physical unit is a vehicle, for example a land vehicle, such as a passenger car.

Further details, features and advantages of the developments according to the present disclosure are described in the description below in connection with the figures, in which exemplary embodiments of the described developments are represented.

It should be understood that the features explained herein can be used not only in the respective combination cited, but also in other combinations, or alone.

DETAILED DESCRIPTION

Figure 1A:
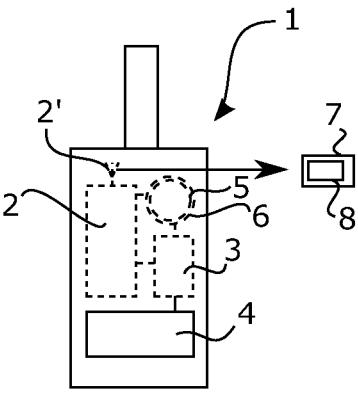
FIG. 1a illustrates an exemplary ID transmitter, according to some aspects of the present disclosure.

As mentioned previously, the acronym BLE stands for "Bluetooth Low Energy." Bluetooth Low Energy is a communication protocol that is specified in the newer Bluetooth specifications with Version 4.0 or more recent, for example, on the priority date of this application, as Bluetooth Core Specification 5.0, on which more detailed information can be found at https://www.bluetooth.com/specifications/specs/core-specification-5-0/.

In some examples, a microcontroller may be coupled with the ID transmitter-BLE interface. Also coupled with the microcontroller is a switching apparatus to output a switching signal to the microcontroller in response to the triggering of the switching apparatus. The ID transmitter thus includes a means or element that, when triggered, outputs a corresponding switching signal to the microcontroller, which transmits to the microcontroller the information that an activation of the switching apparatus has taken place.

Furthermore, the ID transmitter may include a battery compartment to be able to accommodate a battery for power supply. In a further development, it can additionally be provided that a battery is already included in the battery compartment.

The microcontroller is arranged, in response to the receipt of the switching signal on the microcontroller, i.e. after the triggering of the switching apparatus, to trigger the sending of an authentication signal by means of the ID transmitter-BLE interface. Thus, in response to a received switching signal, the microcontroller causes an authentication signal to be sent by means of the ID transmitter-BLE interface. The ID transmitter is thus provided with components that are coupled with one another and arranged to bring about the sending of an authentication signal upon triggering of the switching apparatus.

An aspect of the present disclosure relates to the configuration of the authentication signal. For one, it is determined that authentication signal includes the authentication information. This means that the authentication signal that is sent with the ID transmitter-BLE interface provides the access control unit of a physical unit with the authentication information so that the access control unit, with suitable and mutually-adapted formation of authentication information, can undertake the authentication of the ID transmitter.

A further aspect related to the authentication signal consists of the fact that the authentication signal is configured as a BLE beacon data packet.

The term BLE beacon data packet and, synonymously, beacon data packet in the manner introduced here is to be understood as an abbreviated designation of a Bluetooth low energy beacon data packet. Within the use of Bluetooth low energy within the scope of the Bluetooth specifications with Version 4.0 or newer, the term beacon has established itself. In areas of application in which hardware transmitters emit an identifier for receiving from surrounding receiving devices, a beacon is an established term, known to the person skilled in the art, for the hardware transmitter that sends beacon data packets.

The beacon data packet is a data packet with a small size, typically several 10 to several 100 bytes. The use of beacons is, as a rule, based on prescribed protocols in which the possible composition of the respective beacon data packet is defined, for example on the proprietary iBeacon® protocol of Apple or on the freely-implementable Eddystone® protocol of Google or on the open and freely-available AltBeacon specification. To implement the present development one of these two or any other available beacon protocol may be used.

Areas of application in which beacons are used are frequently connected to localization.

Thus, particularly through the cooperation of the microcontroller and the ID transmitter-BLE interface coupled with it, the ID transmitter according to the present disclosure is capable of sending BLE beacon data packets, i.e.: data packets that in their structure are equivalent or similar to those data packets that are typically sent by beacons. At a moment when the switching apparatus of the ID transmitter is activated, the ID transmitter sends out a beacon packet, which is preferably designed according to an available beacon protocol. The BLE beacon data packets in the available beacon protocols have two features that, for one, are comparatively small (for example, in the case of an iBeacon® data field, 31 bytes and in the case of an Eddystone® beacons, 256 bytes) and for another, that they can be configured in such a way that within the scope of the limited data quantity they are relatively freely configurable. In this way, it can be achieved that an authentication signal can be formed and sent as a BLE beacon data packet that includes authentication information that is sufficiently complex to fulfill adequate security requirements in many application scenarios. For example, the BLE beacon data packet can be configured as an Eddystone beacon that, within an Eddystone frame of up to 256 bytes, uses 128 bytes for authentication information that may, for example, be stored in encrypted form. The BLE data packet may also, for example, be configured as an AltBeacon data packet.

One difference from the beacon transmitters that are increasingly used consists of the fact that applications of the beacon transmitters are typically send beacon packets repeatedly in intervals of milliseconds, while with the ID transmitter according to the present disclosure the authentication signal configured as a BLE beacon is sent in response to the triggering of the switching apparatus.

As such, the ID transmitter according to the present disclosure provides an advantageous combination of properties in multiple respects.

One advantage of the use of beacon communication, i.e. the use in particular of protocols that are based on sending BLE beacon data packets, consists of the fact that—not least due to the prescribed comparatively small size (meaning data quantity) of the individual beacon data packets—it is associated with a comparatively low energy consumption or electricity demand. This, in turn, results in a comparatively long life of the ID transmitter before, for example, a change of battery or, alternatively, the replacement of the ID transmitter, becomes necessary.

A further advantage of an ID transmitter according to the present disclosure results from the properties of BLE communication, upon which the sending of BLE beacon packets is based. BLE radio communication inherently exhibits a severely limited range of radio communication: with the receipt of the authentication signal, the access control unit of the physical unit is thus provided with the information that the ID transmitter is located within a distance around the access control unit-BLE interface that corresponds to the typical range of beacon communication, which in turn lies within the magnitude of several tens of meters, and which—if desired—can still be altered, according to desired requirement scenarios of the developers charged with the implementation of the development, can still be changed to even lower values. The provision of an ID transmitter according to the present disclosure thus renders a receiving physical unit capable of making an initial rough estimate of the user. A further advantage associated with the limited range of beacon communication is that the probability of receipt of the authorization signal sent with the ID transmitter-BLE interface by an undesirable recipient, such as a malicious data user, for example with the goal of carrying out a so-called relay station attack, is reduced. Both of the aforementioned effects lead to an increase in the operational security of the physical unit.

In some examples, the switching apparatus may be configured as a manually operated push button that can be activated by pressing, so that the switching apparatus configured as a push button is triggered. The push button may, for example, be reset using a spring and when pressed, close an electrical contact, whereby the output of the switching signal to the microcontroller is effected.

In some examples, the microcontroller may be arranged to output the authentication signal after the triggering of the switching apparatus if the duration of the pressing, e.g., the time from the start of pressing to the end of pressing, has not exceeded a first-time threshold. For example, the microcontroller can be arranged to record the time period during which the push button is pressed; this can be used, for example, to output the authentication signal if the duration of the pressing is not too great, e.g., a first-time threshold that can be set, for example, between half a second and five seconds. In addition, it may optionally be provided that in a case in which the time threshold is exceeded, instead of the authentication signal, an alternative signal is output, if the duration of pressing has exceeded the first-time threshold. The alternative signal may, for example, also be configured as a BLE beacon data packet. Such an embodiment makes it possible, despite the presence of only one push button, to be able to output two different signals, whereby depending on the duration of the pressing, either authentication is enabled with the authentication signal, for example, the authentication in the car, or with longer pressing, another functionality can be addressed. Such other functionality can be used by manufacturers of physical units, for example, to address additional comfort functions. For example, in a physical unit configured as a vehicle, a comfort function provided, to be triggered by means of an alternative signal, can be the opening and/or closing of a window.

In some examples, after triggering the switching apparatus, the authentication signal may be output and preferably, before the duration of pressing has exceeded a first-time threshold, as well as additionally after sending the authentication signal, an alternative signal, preferably configured as a BLE beacon data packet is sent if the duration of the pressing has exceeded the first-time threshold. In this case, it is possible to both provide the physical unit with the authentication signal and also to then allow a request for another function by means of the alternative signal.

In some examples, the microcontroller may be arranged, after the triggering of the switching apparatus, to output the alternative signal only under the additional condition that the duration of the pressing has not exceeded a second threshold that is greater than the first-time threshold, to reject the triggering as being unsuccessful. With this embodiment it is possible for the user, following the production of the alternative signal, to still abort the sending of the alternative signal. For example, it may be provided that the second time threshold has a value between three and ten seconds. Alternatively, or in addition, it is especially preferred to provide that the first-time threshold is half a second to 5 seconds and the second time threshold is half a second to 5 seconds greater than the first-time threshold.

Alternatively, or in addition, it can be provided that a second switching apparatus is arranged in or on the ID transmitter, whereby the second switching apparatus is preferably configured as a sensor, in particular a motion sensor or as an acceleration sensor or as a gyro sensor. The second sensor should serve to undertake the output of the switching signal to the microcontroller in response to a movement of the ID transmitter. In this way it can be possible for the user to enable the sending of the authentication signal, even without activating the push button. Here, the microcontroller can be arranged to require certain signals output by the acceleration sensor or gyro sensor or motion sensor as a precondition for sending the authorization signal; the query by the microcontroller can, for example, be arranged such that the authentication signal is output by the microcontroller only if a signal output by the sensor is received that conforms to a pre-programmed motion pattern of the user. For example, in a case in which the sensor is configured as an acceleration sensor, it may be provided that the acceleration sensor outputs to the microcontroller an acceleration value that lies above an acceleration threshold. Advantageously, this achieves the fact that even with frequent or repeated movement of the user, the output of the authentication signal does not occur or occurs only rarely in the intended situations, with the advantageous consequence that a share of the power consumption is prevented.

An alternative further development of the ID transmitter provides that the switching apparatus may be configured as a motion sensor or as an acceleration sensor or as a gyro sensor to output the switching signal to the microcontroller in response to a movement of the ID transmitter. In this case, the output of the authentication signal functions dependent on the sensor output, for example analogously to the way previously described, but with the difference that in this variant of the embodiment it is provided that the sensor is the only switching apparatus arranged on the ID transmitter.

Preferably, the authentication signal is configured such that it includes the authentication information in encrypted form. For example, the authentication information may be encrypted with one of the open keys allocated to the access control unit of an asymmetrical cryptographic encryption process. Alternatively, it is possible that the authentication information is encrypted with one of the secret keys allocated to the access control unit of a symmetrical encryption process. The encryption of the authentication information leads to the advantage that even the interception of the authentication signal does not directly result in the compromising of the authentication information. An advantage of this manner of proceeding is that after a capture of the authentication signal, authentication with the original authentication information can still be allowed, so that a software-side adjustment of the cryptographic method is sufficient to restore the original security.

In some examples, the ID transmitter may be configured with an output that is configured as an LED, and is arranged so that, after receipt of a BLE message, which is preferably configured as a Scan request or as a Send request, it outputs a signal. An ID transmitter thus configured may be used in order output information to the user using the BLE message sent from the access control unit, for example concerning the proper receipt of the authentication signal or alternatively, the proper receipt of the authentication information, and perhaps in addition, the signaling of the successful authentication.

In some examples, the ID transmitter-BLE interface and the microcontroller are configured as a system on a chip or part of a system on a chip. This has the advantage that after provision of the correspondent system on chip components, the addition of the ID transmitter, for example at an external production facility, is possible with little expenditure of time.

In some examples, a separate memory element may be configured in the ID transmitter, on which the authentication information is filed. The memory element may, for example, be wired to the microcontroller, and/or the memory element may be configured as an RFID transponder, preferably as a passive RFID transponder, or as an NFC tag.

The configuration of the memory element that includes the authentication information as an RFID transponder or an NFC tag has the advantage that the ID transmitter itself can be used to share the authentication information through holding it to a corresponding access control unit of a physical unit equipped with an RFID reader or NFC reader. A certain level of security may thus be assured through the limited transmission range of the RFID transponder or the NFC tag. A correspondingly configured ID transmitter thus has two capabilities, namely the ability, through triggering the switching apparatus, to bring about the output of the authentication signal, which preferably includes the authentication information in encrypted form, as well as the ability, in an alternative application, to transmit the authentication information through directly holding the ID transmitter to a correspondingly-configured RFID reader or an NFC chip configured for reading NFC information. For the latter case, it is also not absolutely necessary that the authentication information is encrypted, since due to the limited transmission range, overhearing the transmitted information may be assessed as sufficiently unlikely. The embodiment of the ID transmitter described here has the advantage that, for example in a situation in which the power supply can no longer be assured, for example when the battery is drained, access to the physical unit nevertheless remains assured, so that there is emergency access functionality.

In some examples, the ID transmitter may be configured such that the microcontroller is arranged to receive the authentication information that is present on the memory element, either through wired transmission or based on an NFC chip that is wired to the microcontroller and configured to read the NFC tag, then to encrypt it, if applicable with additional required or desired information, such as a UUID, to form a BLE beacon packet with it and to send that out as an authentication signal. This manner of proceeding can be implemented in a particularly elegant manner based on the use of the BLE beacon data packet since, for example, the known AES encryption process is provided by several beacon In some examples, the ID transmitter may be configured in multiple parts. In this variant, the ID transmitter includes at least a first ID transmitter part and a second ID transmitter part, whereby the first ID transmitter part and the second ID transmitter part are connected to one another detachably or non-detachably. The first ID transmitter part has at least the ID transmitter BLE interface with the antenna and the microcontroller. Preferably, the first ID transmitter part also has the switching apparatus and the battery compartment. The second ID transmitter part has at least the separate memory element. In the case that the first ID transmitter part does not include the switching apparatus and the battery compartment, this can also be a component of the second ID transmitter part.

FIG. 1*a* shows a first exemplary embodiment of an ID transmitter for authentication on an access control unit of a physical unit. In order to achieve the desired functionality, the ID transmitter 1 has, for one thing, an ID transmitter-BLE interface with an antenna 2', whereby the antenna 2' is illustrated as a component of the ID transmitter-BLE interface 2. Furthermore, a microcontroller 3 is arranged in the ID transmitter 1, which is coupled with the ID transmitter-BLE interface 2. The ID transmitter-BLE interface 2 and the microcontroller 3 are configured as a system on a chip. The ID transmitter 1 further has a switching apparatus 4, which is configured as a manually operated push button 4. Moreover, a battery 5 is accommodated in a battery compartment 6 which, as a power supply source, ensures the functionality of the ID transmitter 1. Upon pressing the push button 4 an electrical contact is closed and thereupon a switching signal is output to the microcontroller 3. The microcontroller 3 is arranged, especially through suitable programming, to recognize the receipt of the switching signal and to respond to this switching signal in a prescribed manner. In response to the receipt of the switching signal, the microcontroller 3 causes the sending of an authentication signal 7 by means of the ID transmitter-BLE interface 2. The authentication signal 7 is configured as a BLE beacon data packet and for this reason is only several 10 to several 100 bytes in size, mostly less than 1000 bytes, and can, for example, be configured as an Eddystone® beacon data packet or as an AltBeacon. The authentication signal configured as a BLE beacon data packet comprises at least one piece of authentication information 8, with which the authentication on an access control unit of a physical unit correspondingly prepared for this can take place.

Figure 1B:
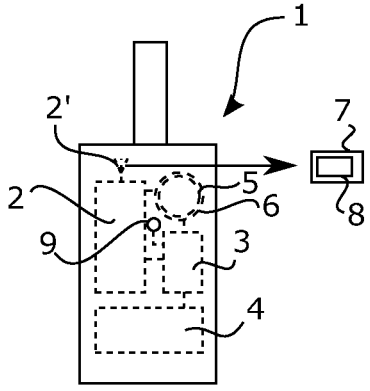
FIG. 1b illustrates another exemplary ID transmitter, according to some aspects of the present disclosure.

In FIG. 1*b* another embodiment of an ID transmitter 1 is represented. The embodiment represented in FIG. 1*b* differs from the embodiment represented in FIG. 1*a* in that the switching apparatus 4 is configured as a gyro sensor that, in response to movement of the ID transmitter 1, outputs a switching signal to the microcontroller 3.

Moreover, the ID transmitter 1 has output means 9 configured as an LED, that is coupled with the microcontroller 3. After receipt of a prescribed BLE message, preferably configured as a Scan request or as a Send request, to the ID transmitter-BLE interface 2, the LED 9 is driven by the microcontroller 3 to output a light signal. Thus, with corresponding programming of the source of the prescribed BLE message, the user can be informed with a return message of, for example, the proper receipt of the authentication signal 7 or of the successful authentication using the authentication information.

Figure 2:
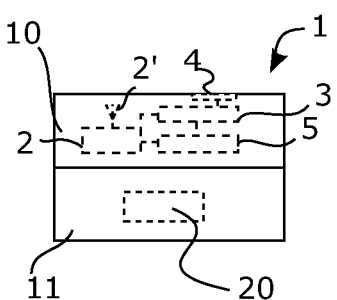
FIG. 2 illustrates yet another exemplary ID transmitter, according to some aspects of the present disclosure.

FIG. 2 shows a third exemplary embodiment of an ID transmitter 1 according to some aspects of the present disclosure, in a side view. The ID transmitter 1 in the embodiment shown has all the same elements as the ID transmitter 1 shown in FIG. 1. The embodiment shown in FIG. 2 further has the feature according to which the ID transmitter 1 is configured of multiple parts, namely a first ID transmitter part 10 and a second ID transmitter part 11, which are detachably connected to one another. The first ID transmitter part 10 has the ID transmitter-BLE interface 2 with the antenna 2', the microcontroller 3, the push button 4 and the battery compartment 5. In the second ID transmitter part 11 there is a separate memory element configured as an NFC tag 20, on which the authentication information is filed. The microcontroller 3 positioned in the first ID transmitter part 10 is configured with an NFC chip for reading the NFC tag, and is rendered capable of receiving the authentication information 8 that is transmitted, of then encrypting it, and of sending it out as a component of an authentication signal configured as a BLE beacon packet 7.

Figure 3:
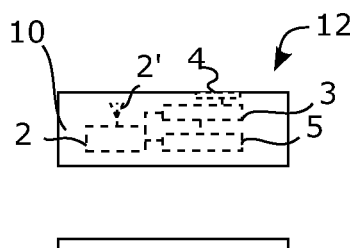
FIG. 3 illustrates an exemplary set, or kit, according to some aspects of the present disclosure, for assembling an ID transmitter.
Figure 3:
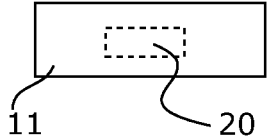

FIG. 3 shows a set 12 for assembling an ID transmitter 1, for example in an embodiment of the type illustrated in FIG. 2. The set comprises the first ID transmitter part 10 and the second ID transmitter part 11 separately. By connecting the first ID transmitter part 10 with the second ID transmitter part 11, the ID transmitter is created.

Figure 4:
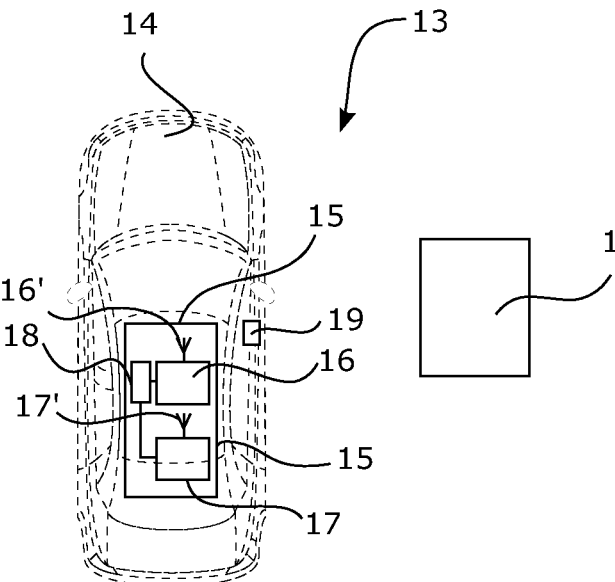
FIG. 4 illustrates a system comprising an ID transmitter and a physical unit, according to some aspects of the present disclosure.

FIG. 4 shows a system 13 consisting of an ID transmitter 1 and a physical unit 14 configured as a passenger car. The vehicle has an access control unit 15 configured as a vehicle control system, whereby the access control unit 15 comprises:

an access control unit-BLE-interface 16 with an antenna 16', a second access control unit-BLE interface 17 with a second antenna 17', control and memory apparatus 18, coupled with the access control unit-BLE interface, whereby the control and memory apparatus are configured to test the authenticity of an authentication signal received from the access control unit-BLE interface.

An NFC reader 19 is arranged on the vehicle, coupled with the control and memory apparatus 18, with which authentication information that is filed on an NFC tag of an ID transmitter, for example the NFC tag 20 of the ID transmitter shown in FIG. 3, can be read.

The invention claimed is:

1. An ID transmitter for authentication on a control unit of a physical unit using authorization information transmitted from an ID transmitter, wherein the ID transmitter comprises:

an ID transmitter-Bluetooth Low Energy (BLE) interface comprising an antenna;

a microcontroller, coupled with the ID transmitter-BLE interface; and a switching apparatus, coupled with the microcontroller, for outputting a switching signal to the microcontroller in response to a triggering of the switching apparatus, wherein the microcontroller is configured, in response to the receipt of the switching signal on the microcontroller after the triggering of the of the switching apparatus, to trigger the transmission of an authentication signal using the ID transmitter-BLE interface, wherein the authentication signal comprises authentication information, and wherein the authentication signal is configured as a BLE beacon data packet, wherein the switching apparatus comprises a manually operated push button for triggering the switching apparatus, wherein the microcontroller is configured, after the triggering of the switching apparatus, to:

output the authentication signal if the duration of pressing has not exceeded a first-time threshold, or output the authentication signal if a duration of the pressing has not exceeded a first-time threshold, but to output an alternative signal, configured as a BLE beacon data packet, if the duration of the pressing has exceeded the first-time threshold, or output the authentication signal, before the duration of pressing has exceeded a first-time threshold, and in addition, after the sending of the authentication signal, to output an alternative signal, configured as a BLE beacon data packet, if the duration of pressing has exceeded the first-time threshold.

2. The ID transmitter according to claim 1, wherein the microcontroller is configured to output the alternative signal only under an additional condition requiring that the duration of the pressing has not exceeded a second time threshold that is greater than the first time threshold, and otherwise reject the triggering as being unsuccessful.

3. The ID transmitter according claim 1, further comprising:

a second switching apparatus coupled to the microcontroller, the second switching apparatus being configured as a sensor in or on the ID transmitter for outputting the switching signal to the microcontroller in response to a movement of the ID transmitter.

4. The ID transmitter according to claim 1, wherein the switching apparatus is configured as one or (i) a motion sensor, (ii) an acceleration sensor, or (iii) a gyro sensor for outputting the switching signal to the microcontroller in response to a movement of the ID transmitter.

5. The ID transmitter according to claim 1, wherein the authentication signal comprises encrypted authentication information, comprising one of (i) a public key of an asymmetrical cryptographic encryption process allocated to the access control unit or (ii) a secret key of a symmetrical cryptographic encryption process allocated to the access control unit.

6. The ID transmitter according to claim 1, wherein the ID transmitter comprises an output comprising an LED, that is configured for signal output after receipt of a Scan request or a Send request BLE message.

7. The ID transmitter according to claim 1, wherein the ID transmitter-BLE interface and the microcontroller are configured as a system-on-a-chip or part of a system-on-a-chip.

8. The ID transmitter according to claim 1, further comprising a separate memory element in the ID transmitter, on which the authorization information is stored.

9. The ID transmitter according to claim 8, wherein the memory element is configured as an RFID-Transponder.

10. The ID transmitter according to claim 8, wherein the microcontroller is configured to encrypt the authentication information provided to it by the memory element and to form the authentication signal provided with the authentication information configured as a BLE beacon packet.

11. The ID transmitter according to claim 8, wherein the ID transmitter is configured in multiple parts and has at least one first ID transmitter part and a second ID transmitter part that are detachably or non-detachably connected to one another, wherein the first ID transmitter part comprises the ID transmitter-BLE interface with the antenna and the microcontroller, and wherein the second ID transmitter part comprises the separate memory element.

12. A system comprising a physical unit having an access control unit and an ID transmitter, the system being configured to authenticate the ID transmitter using authentication information transmitted from the ID transmitter, wherein the access control unit comprises:

a Bluetooth Low Energy (BLE) interface comprising an antenna, the BLE interface being part of the access control unit; and an access control and memory apparatus coupled with the BLE interface, wherein the access control and memory apparatus are configured to test the authenticity of an authentication signal received via the BLE interface, wherein the authentication signal is configured as a BLE beacon data packet and comprises authentication information, wherein the system is configured such that the authentication signal is generated by the ID transmitter during operation of the system in response to a manual input, wherein the system is further configured such that the authentication signal comprises the authentication information when a duration associated with the manual input has not exceeded a first-time threshold, and such that an alternative signal, configured as a BLE beacon data packet, is generated when the duration associated with the manual input has exceeded the first-time threshold, and wherein the authentication information transmitted by the ID transmitter and authentication testing information stored on the access control and memory apparatus correspond to one another and comprise complementary cryptographic keys.

13. The system according to claim 12, wherein the physical unit comprises a number n of at least two access control unit-BLE interfaces that are configured at a distance from one another, and wherein the control and memory apparatus are configured on the access control unit-BLE interface to evaluate captured RSSI values for an n-lateration and/or an n-angulation for determining the position of the ID transmitter upon receipt of the authentication signal.

14. The system according to claim 12, further comprising an NFC reader configured on the physical unit, the NFC reader being coupled with the control and memory apparatus, wherein the control and memory apparatus is configured to test the authenticity of authentication information captured with the NFC reader.

15. The system according to one of claim 12, further comprising a smartphone that is configured to transmit the authentication signal as a BLE beacon data packet.

16. The system according to one of claim 12, wherein the physical unit comprises a vehicle.

17. A kit for use in assembling an ID transmitter for authentication on a control unit of a physical unit, the kit comprising:

a first ID transmitter part comprising a Bluetooth Low Energy (BLE) interface including an antenna; and a second ID transmitter part comprising a storage element configured to store authentication information;

wherein the first ID transmitter part and the second ID transmitter part are configured to be mechanically coupled to one another to form the ID transmitter, wherein, when the first ID transmitter part and the second ID transmitter part are coupled, the ID transmitter is configured to transmit an authentication signal configured as a BLE beacon data packet and comprising the authentication information, and wherein the authentication information stored on the storage element is configured to correspond to authentication testing information of the control unit using complementary cryptographic keys.

18. The kit according to claim 17, wherein the first ID transmitter part and a second ID transmitter part are configured to be mechanically coupled to each other via a bayonet catch.

\* \* \* \* \*